United States Patent
Chen

(10) Patent No.: US 9,268,117 B2
(45) Date of Patent: Feb. 23, 2016

(54) IMAGE CAPTURE DEVICE AND CONVERTER LENS ASSEMBLY THEREOF

(71) Applicants: Sintai Optical (Shenzhen) Co., Ltd., Shenzhen City, Guandong Province (CN); Asia Optical International Ltd., Tortola (GB)

(72) Inventor: Ming-Chung Chen, Taichung (TW)

(73) Assignees: SINTAI OPTICAL (SHENZHEN) CO., LTD., Shenzhen, Guandong Province (CN); ASIA OPTICAL INTERNATIONAL LTD., Tortola, Virgin Islands (GB)

( * ) Notice: Subject to any disclaimer, the term of this patent is extended or adjusted under 35 U.S.C. 154(b) by 120 days.

(21) Appl. No.: 14/087,014

(22) Filed: Nov. 22, 2013

(65) Prior Publication Data
US 2014/0168500 A1    Jun. 19, 2014

(30) Foreign Application Priority Data
Dec. 19, 2012    (TW) .............................. 101148450 A

(51) Int. Cl.
*G02B 9/60*    (2006.01)
*G02B 13/00*    (2006.01)
*G02B 13/18*    (2006.01)

(52) U.S. Cl.
CPC ................ *G02B 13/009* (2013.01); *G02B 9/60* (2013.01); *G02B 13/0045* (2013.01); *G02B 13/18* (2013.01)

(58) Field of Classification Search
CPC ........ G02B 15/02; G02B 15/04; G02B 15/06; G02B 15/08; G02B 15/10; G02B 15/12; G02B 13/0045; G02B 13/009; G02B 13/18; G02B 9/60
See application file for complete search history.

(56) References Cited

U.S. PATENT DOCUMENTS

| | | | | |
|---|---|---|---|---|
| 4,239,340 | A * | 12/1980 | Ogino ........................... | 359/675 |
| 5,253,112 | A * | 10/1993 | Suzuki et al. .................. | 359/675 |
| 6,690,518 | B2 * | 2/2004 | Shijo et al. .................... | 359/675 |
| 7,593,163 | B2 * | 9/2009 | Yamada et al. ............... | 359/675 |
| 7,843,646 | B2 * | 11/2010 | Yang ............................. | 359/673 |
| 2002/0097502 | A1 * | 7/2002 | Nakazawa et al. ............ | 359/673 |
| 2007/0280677 | A1 * | 12/2007 | Drake et al. ................... | 396/429 |

* cited by examiner

*Primary Examiner* — David N Spector
(74) *Attorney, Agent, or Firm* — McClure, Qualey & Rodack, LLP

(57) ABSTRACT

An image capture device and a converter lens assembly thereof are provided. The image capture device includes a mobile phone and the converter lens assembly wherein the converter lens assembly is connected to the mobile phone. The converter lens assembly includes a first lens, a second lens, a third lens, a fourth lens and a fifth lens, all of which are arranged in sequence from an object side to an image side along an optical axis. The first lens is with positive refractive power. The fourth lens is with positive refractive power. The converter lens assembly satisfies the condition: $1<|f_1/f_2|<2$ and/or the condition: $1<|f_{345}/f_2|<2$, wherein $f_1$ is the effective focal length of the first lens, $f_2$ is the effective focal length of the second lens, $f_{345}$ is the effective focal length of the combination of the third lens, the fourth lens and the fifth lens.

15 Claims, 16 Drawing Sheets

IMAGE CAPTURE DEVICE AND CONVERTER LENS ASSEMBLY THEREOF

BACKGROUND OF THE INVENTION

1. Field of the Invention

The invention relates to an image capture device and converter lens assembly thereof.

2. Description of the Related Art

Most current mobile phones have photographic function. Some mobile phones can take photos with image resolution up to 8 megapixels or even more than 8 megapixels that is capable of generating good image quality. However, most imaging lenses of mobile phones are fixed focal length lenses because of the slim trend. Very few mobile phones have zoom lenses but are not popular among people because they are thicker and not easy to carry.

In view of this, a converter lens has been developed enabling a lightweight and slim mobile phone to have a zooming function. When in use, one end of the converter lens assembly is connected to the lens of a mobile phone and then a zoom lens is connected to the other end of the converter lens assembly. However, the image taken by the mobile phone with the zoom lens externally connected thereto is still unsatisfying in quality and the brightness of image edge is obviously lower.

BRIEF SUMMARY OF THE INVENTION

The invention provides an image capture device and converter lens assembly thereof to solve the above problems. The image capture device includes a mobile phone, a converter lens assembly and a zoom lens. When one end of the converter lens assembly is connected to the mobile phone and the other end of the converter lens assembly is connected to the zoom lens, the mobile phone with a fixed focal length lens function is changed to one with a zoom lens function, thereby effectively increases the brightness of image edge and provides good image quality. When only one end of the converter lens assembly is connected to the mobile phone, the mobile phone with fixed focal length lens function is changed to one with marco lens function and capable of generating a high magnification photo in near distances.

The converter lens assembly in accordance with an exemplary embodiment of the invention includes a first lens, a second lens, a third lens, a fourth lens and a fifth lens, all of which are arranged in sequence from an object side to an image side along an optical axis. The first lens is with positive refractive power. The fourth lens is with positive refractive power. The converter lens assembly satisfies: $1<|f_2/f_2|<2$ and/or $1<|f_{345}/f_2|<2$ wherein $f_1$ is the effective focal length of the first lens, $f_2$ is the effective focal length of the second lens, and $f_{345}$ is the effective focal length of the combination of the third lens, the fourth lens and the fifth lens.

In another exemplary embodiment, the second lens is with negative refractive power and the third lens is with positive refractive power.

In yet another exemplary embodiment, the second lens is with positive refractive power and the third lens is with negative refractive power.

In another exemplary embodiment, the fifth lens is with positive refractive power.

In yet another exemplary embodiment, the fifth lens is with negative refractive power.

In another exemplary embodiment, the first lens is a biconvex lens, the second lens is a biconcave lens with negative refractive power, the third lens is a biconvex lens with positive refractive power, the fourth lens is a biconvex lens and the fifth lens is a convex-concave lens with negative refractive power.

In yet another exemplary embodiment, the first lens is a concave-convex lens, the second lens is a biconcave lens with negative refractive power, the third lens is a biconvex lens with positive refractive power, the fourth lens is a biconvex lens and the fifth lens is convex-concave lens with positive refractive power.

In another exemplary embodiment, the first lens includes two surfaces, at least one of which is an aspheric surface.

In yet another exemplary embodiment, the second lens includes two surfaces, at least one of which is an aspheric surface.

In another exemplary embodiment, the third lens includes two surfaces, at least one of which is an aspheric surface.

In yet another exemplary embodiment, the third lens includes two surfaces, both of which are spherical surfaces.

In another exemplary embodiment, the fourth lens includes two surfaces, at least one of which is an aspheric surface.

In yet another exemplary embodiment, the fifth lens includes two surfaces, at least one of which is an aspheric surface.

The image capture device in accordance with an exemplary embodiment of the invention includes a mobile phone and a converter lens assembly. The converter lens assembly includes an end, and the end is connected to the mobile phone.

In another exemplary embodiment, the image capture device future includes a zoom lens, the zoom lens includes an end, and the end is connected to the converter lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The aspheric surface sag z of each lens for all of the preferred embodiments of the invention can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In order to maintain good optical performance of the converter lens assembly of the invention, the converter lens assembly in accordance with all of the preferred embodiments of the invention must satisfies conditions:

$$1 < |f_1/f_2| < 2 \quad (1)$$

and/or $$1 < |f_{345}/f_2| < 2 \quad (2)$$

wherein $f_1$ is the effective focal length of the first lens, $f_2$ is the effective focal length of the second lens, and $f_{345}$ is the effective focal length of the combination of the third lens, the fourth lens and the fifth lens.

Figure 1:
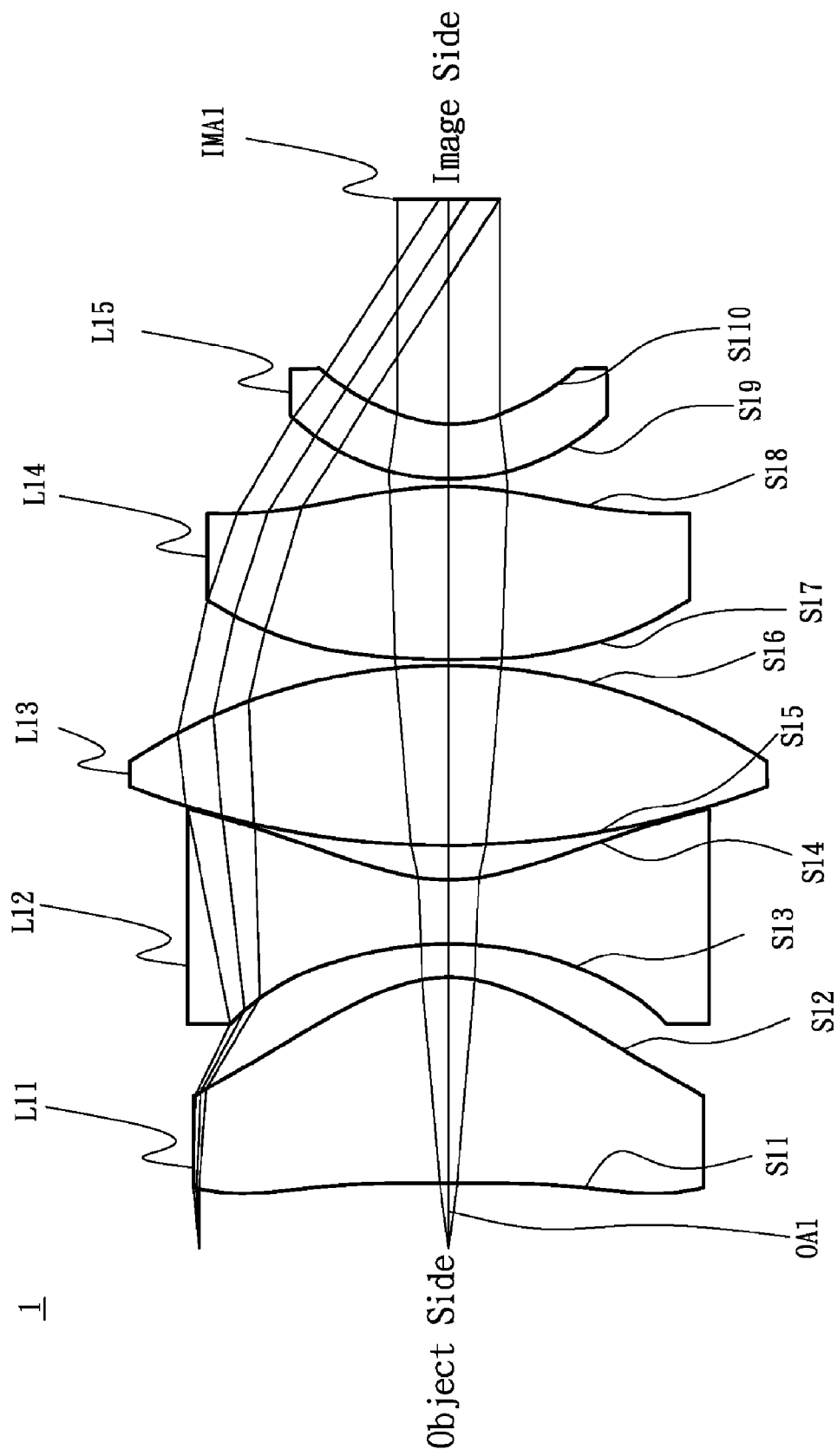
FIG. 1 is a lens layout and optical path diagram of a converter lens assembly in accordance with a first embodiment of the invention.

Referring to FIG. 1, FIG. 1 is a lens layout and optical path diagram of a converter lens assembly in accordance with a first embodiment of the invention. The converter lens assembly 1 includes a first lens L11, a second lens L12, a third lens L13, a fourth lens L14 and a fifth lens L15, all of which are arranged in sequence from an object side to an image side along an optical axis OA1. The first lens L11 is a biconvex lens with positive refractive power and made of plastic material. The object side surface S11 and the image side surface S12 are aspheric surfaces. The second lens L12 is a biconcave lens with negative refractive power and made of plastic material. The object side surface S13 and the image side surface S14 are aspheric surfaces. The third lens L13 is a biconvex lens with positive refractive power and made of glass material. The object side surface S15 and the image side surface S16 are spherical surfaces. The fourth lens L14 is a biconvex lens with positive refractive power and made of plastic material. The object side surface S17 and the image side surface S18 are aspheric surfaces. The fifth lens L15 is a convex-concave lens with negative refractive power and made of plastic material. The object side surface S19 and the image surface S110 are aspheric surfaces.

By the above design of the lenses, the converter lens assembly 1 is provided with good optical performance when connecting to a zoom lens.

In order to achieve the above purpose and effectively enhance the optical performance, the converter lens assembly 1 of the first embodiment of the invention is provided with the optical specifications shown in Table 1, which include radius of curvature of each lens surface, thickness between adjacent surface, refractive index of each lens and Abbe number of each lens.

TABLE 1

| Surface Number | Radius of Curvature (mm) | Thickness (mm) | Nd | Vd | Remark |
|---|---|---|---|---|---|
| S11 | 442.93 | 3.212460 | 1.535 | 56 | The First Lens L11 |
| S12 | −2.19 | 0.522588 | | | |
| S13 | −5.39 | 1 | 1.636 | 24 | The Second Lens L12 |
| S14 | 2.85 | 0.542298 | | | |
| S15 | 13.87 | 2.8 | 1.795 | 45.3 | The Third Lens L13 |
| S16 | −8.94 | 0.1 | | | |
| S17 | 15.16 | 2.7 | 1.535 | 56 | The Fourth Lens L14 |
| S18 | −4.89 | 0.1 | | | |
| S19 | 3 | 0.88 | 1.535 | 56 | The Fifth Lens L15 |
| S110 | 2 | 3.499974 | | | |

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S11 | 4.01E+03 | −5.76E−03 | 4.64E−04 | −3.17E−06 | −2.83E−07 | 6.03E−10 | −5.58E−11 | |
| S12 | −3.25E+00 | −3.42E−03 | 4.53E−04 | −1.55E−05 | −1.31E−07 | 1.48E−08 | −3.56E−10 | |
| S13 | 5.81E−01 | 3.17E−03 | −2.59E−04 | −2.42E−06 | 3.64E−07 | 1.99E−08 | −1.10E−09 | |
| S14 | −6.33E+00 | −8.49E−04 | 1.10E−05 | −1.02E−07 | −7.03E−09 | −3.10E−10 | 2.66E−11 | |
| S17 | 1.21E+01 | 2.41E−03 | −2.36E−05 | −9.84E−07 | −2.36E−08 | −1.00E−09 | −2.22E−10 | −2.50E−11 |
| S18 | −1.13E+01 | 1.93E−03 | 1.80E−05 | 6.48E−07 | −1.69E−07 | | | |
| S19 | −8.99E−01 | −4.42E−03 | 4.57E−04 | −3.95E−05 | 8.56E−06 | −2.12E−07 | −1.02E−08 | 2.40E−08 |
| S110 | −1.64E+00 | −1.22E−02 | 2.96E−03 | −9.19E−05 | −4.93E−05 | 2.00E−07 | 5.00E−06 | −2.80E−07 |

For the converter lens assembly 1 of the first embodiment, the effective focal length $f_1$ of the first lens L11 is equal to 5.01 mm, the effective focal length $f_2$ of the second lens L12 is equal to −2.95 mm, the effective focal length $f_{345}$ of the combination of the third lens L13, the fourth lens L14 and the fifth lens L15 is equal to 3.99 mm. According to the above data, the following values can be obtained:

$$|f_1/f_2| = 1.698305,$$

$$|f_{345}/f_2| = 1.352542,$$

which respectively satisfy the above conditions (1) and (2).

Figure 2A:
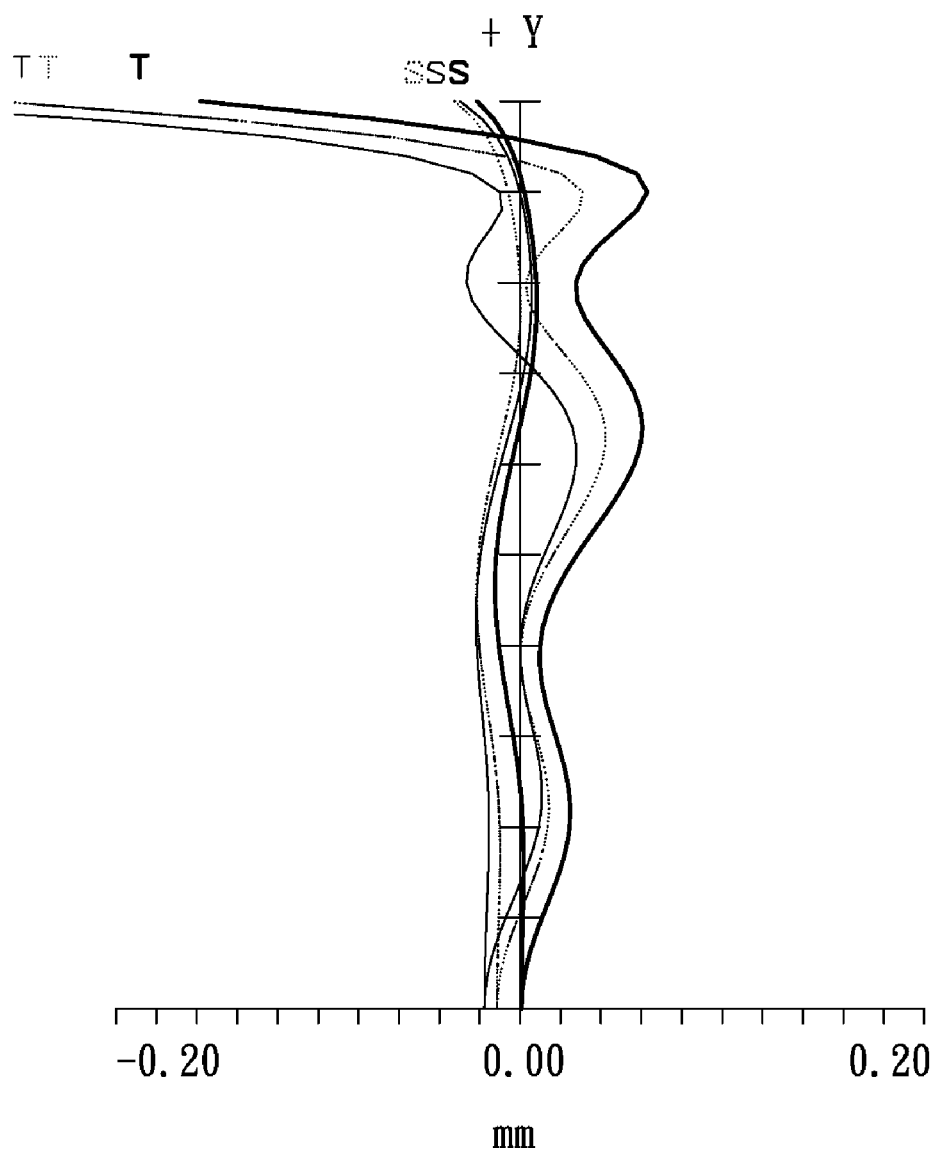
FIG. 2A is a field curvature diagram of a converter lens assembly in accordance with a first embodiment of the invention.
Figure 2B:
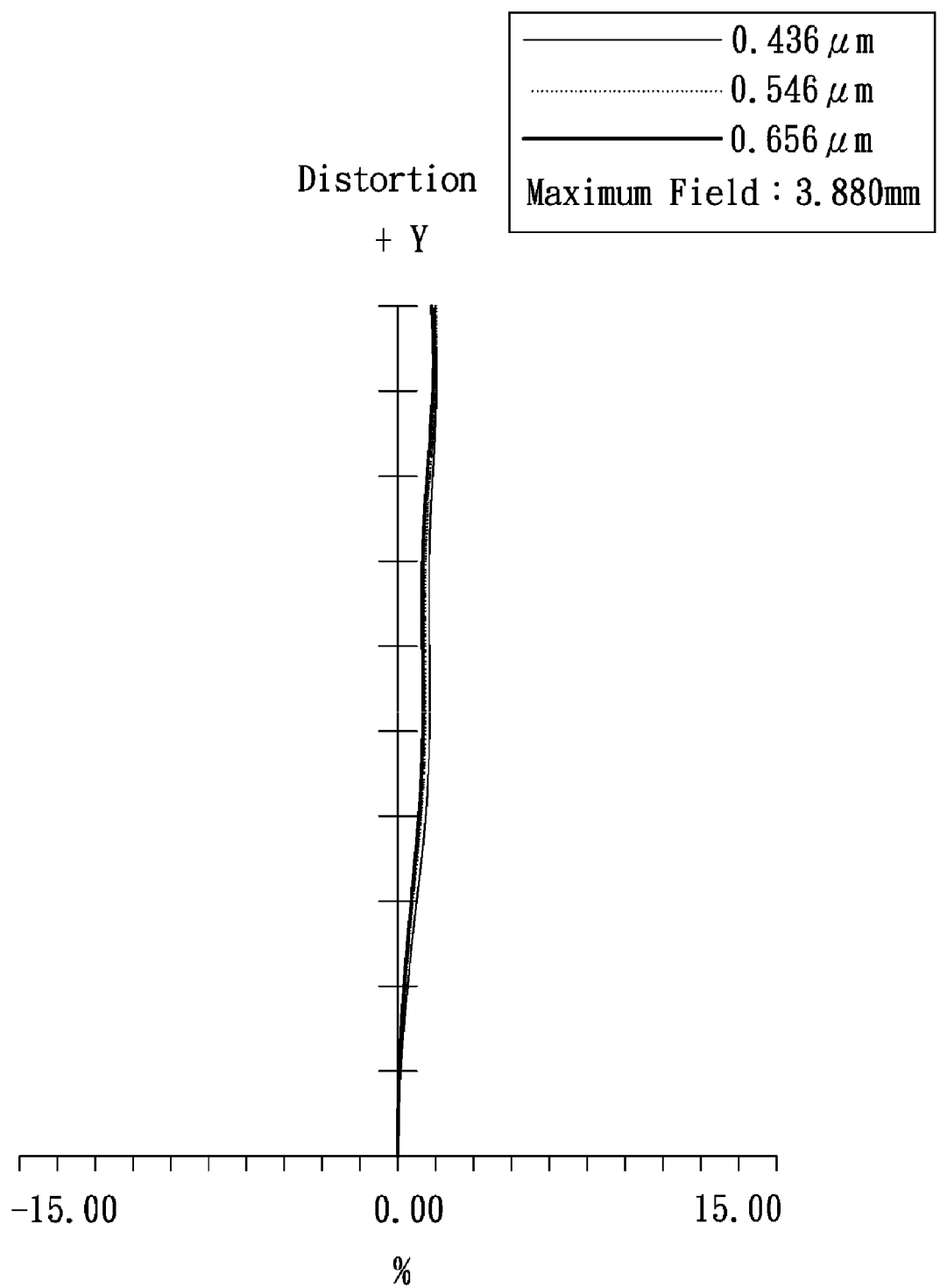
FIG. 2B is a distortion diagram of a converter lens assembly in accordance with a first embodiment of the invention.
Figure 2C:
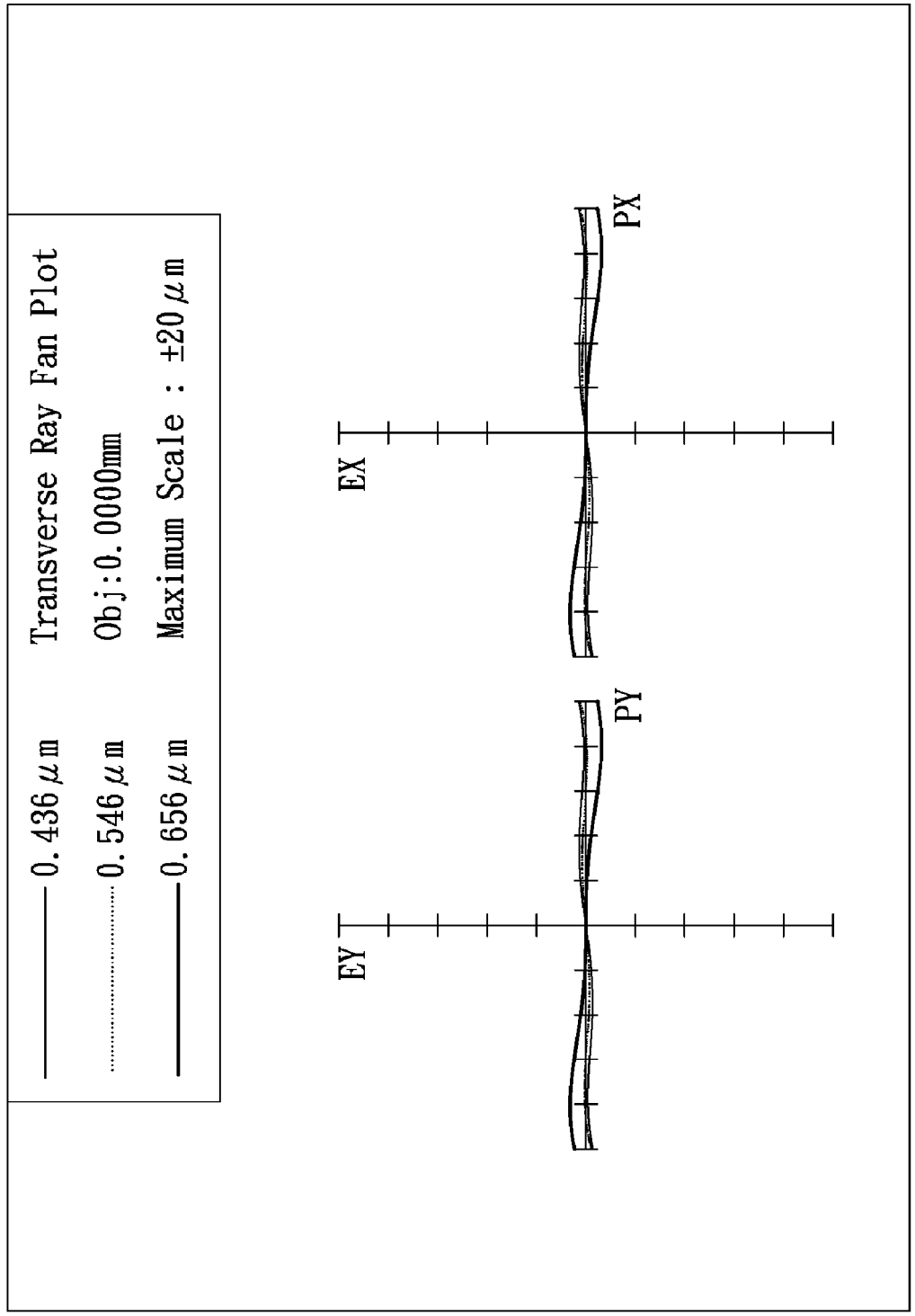
FIGS. 2C-2F are transverse ray fan diagrams of a converter lens assembly in accordance with a first embodiment of the invention.
Figure 2D:
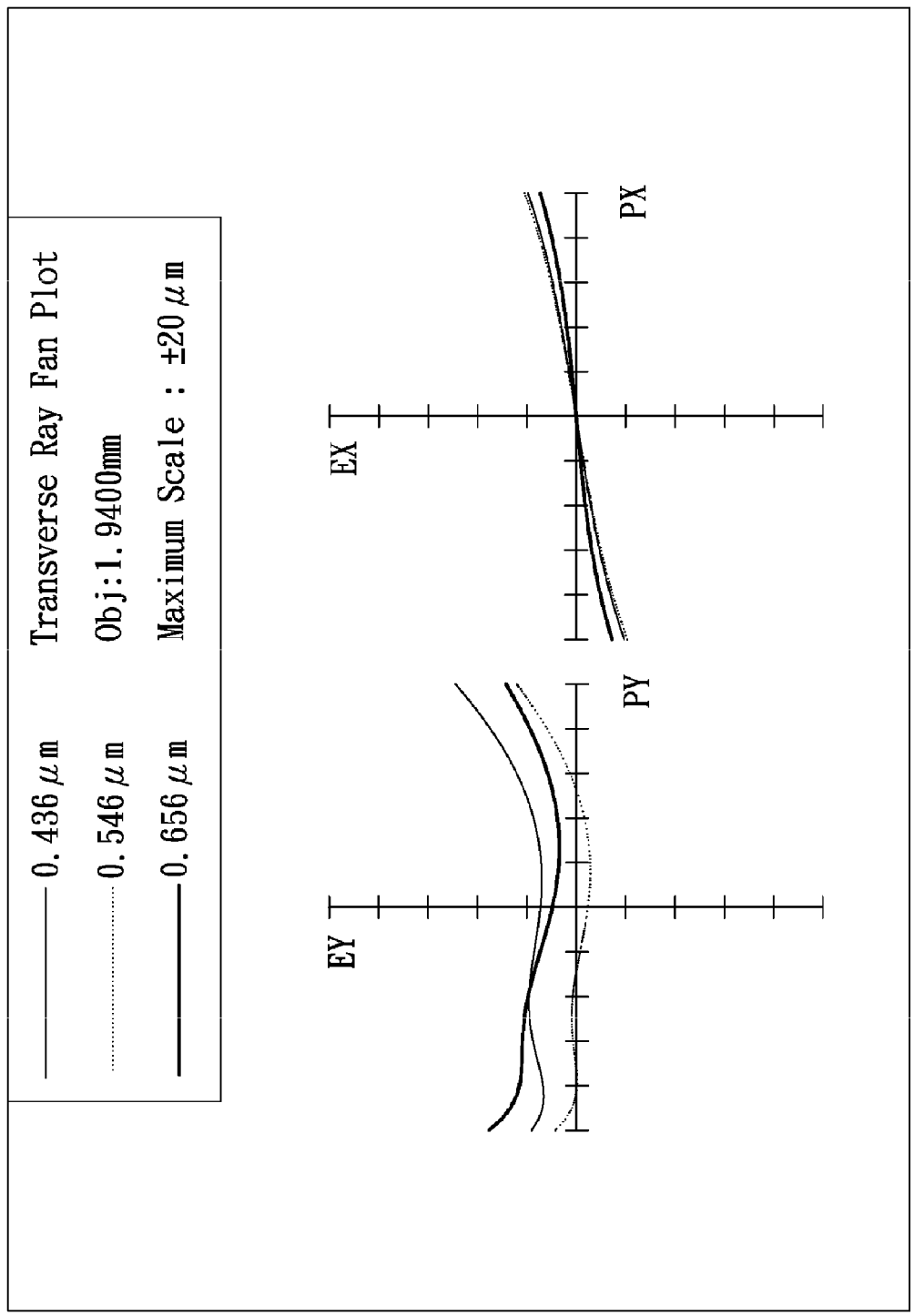
Figure 2E:
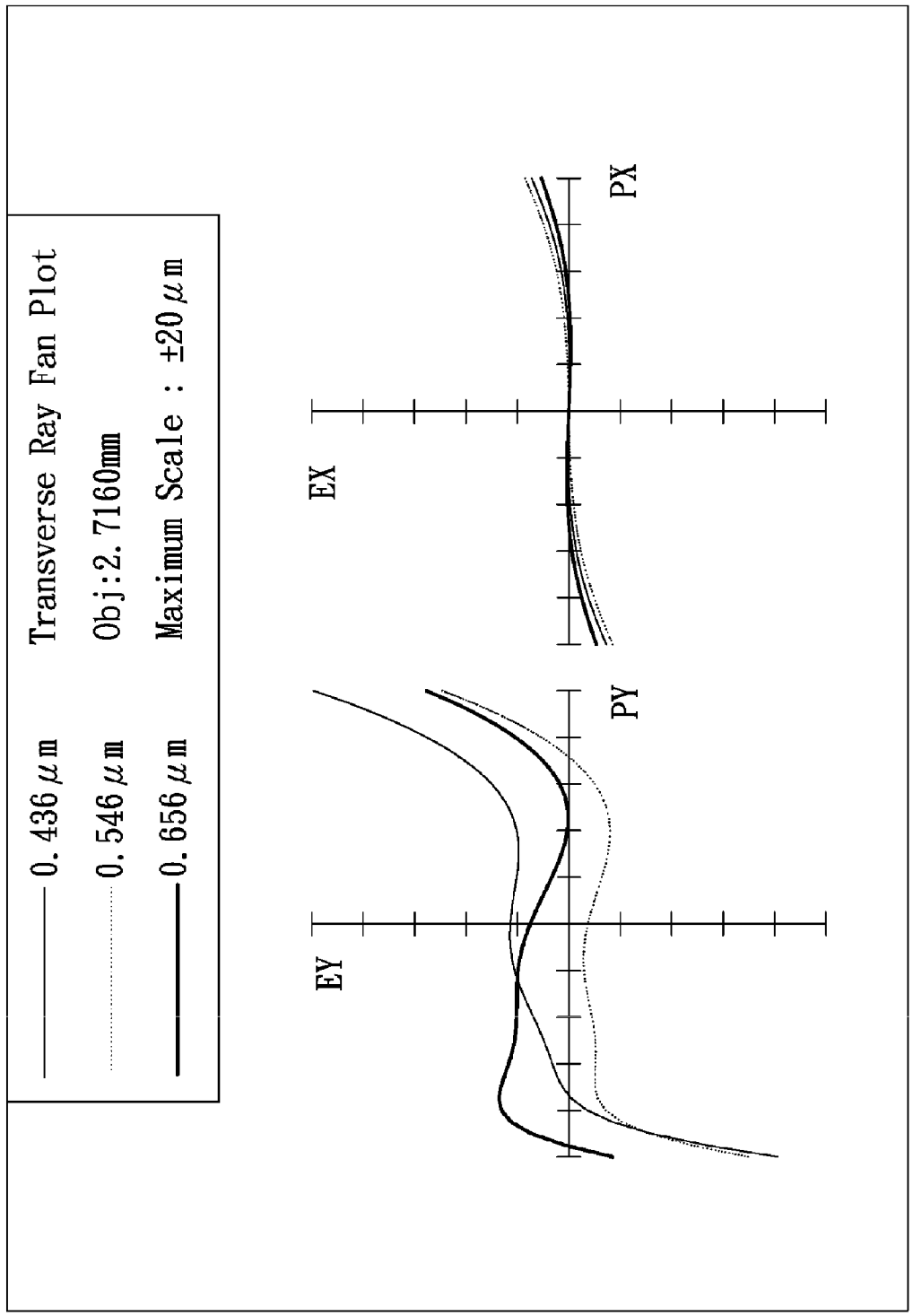
Figure 2F:
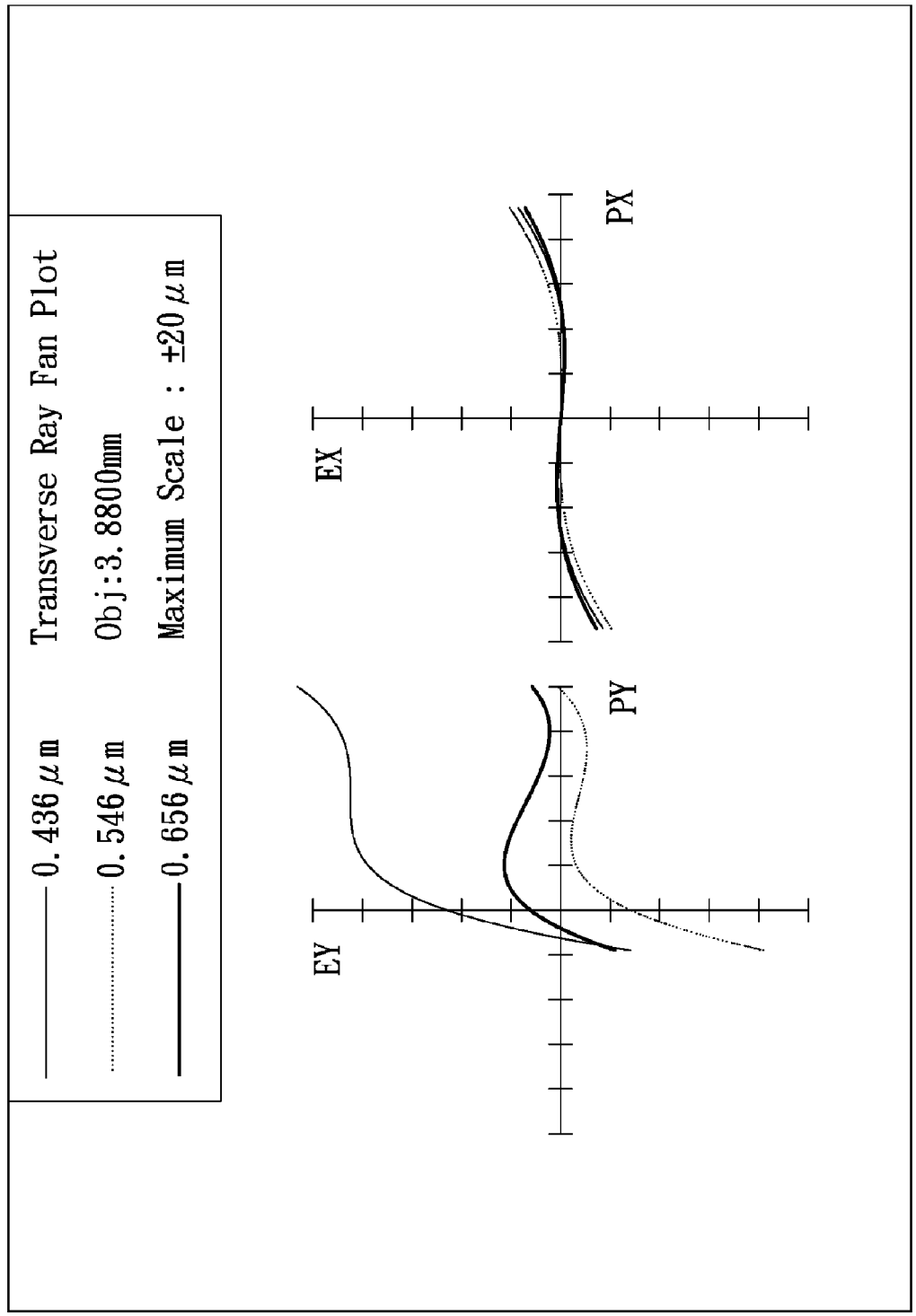

By the above arrangements of the lenses, the converter lens assembly 1 of the first embodiment can meet the requirements of optical performance as seen in FIGS. 2A-2F, wherein FIG. 2A shows the field curvature diagram of the converter lens assembly 1 of the first embodiment, FIG. 2B shows the distortion diagram of the converter lens assembly 1 of the first embodiment, and FIGS. 2C-2F show the transverse ray fan diagram of the converter lens assembly 1 of the first embodiment.

It can be seen from FIG. 2A that the field curvature of tangential direction and sagittal direction in the converter lens assembly 1 of the first embodiment ranges between −0.25 mm and 0.07 mm for the wavelength range between 0.436 μm and 0.656 μm. It can be seen from FIG. 2B (the three lines in the figure almost coincide to appear as if a signal line) that the distortion in the converter lens assembly 1 of the first embodiment is smaller than 3.0% for the wavelength range between 0.436 μm and 0.656 μm. It can be seen from FIGS. 2C-2F that the transverse ray fan of different image highs in the converter lens assembly 1 of the first embodiment ranges between −18 μm and 22 μm for the wavelength range between 0.436 μm and 0.656 μm. It is obvious that the field curvature, the distortion and the transverse ray fan of the converter lens assembly 1 of the first embodiment can be corrected effectively, thereby capable of obtaining good optical performance.

Figure 3:
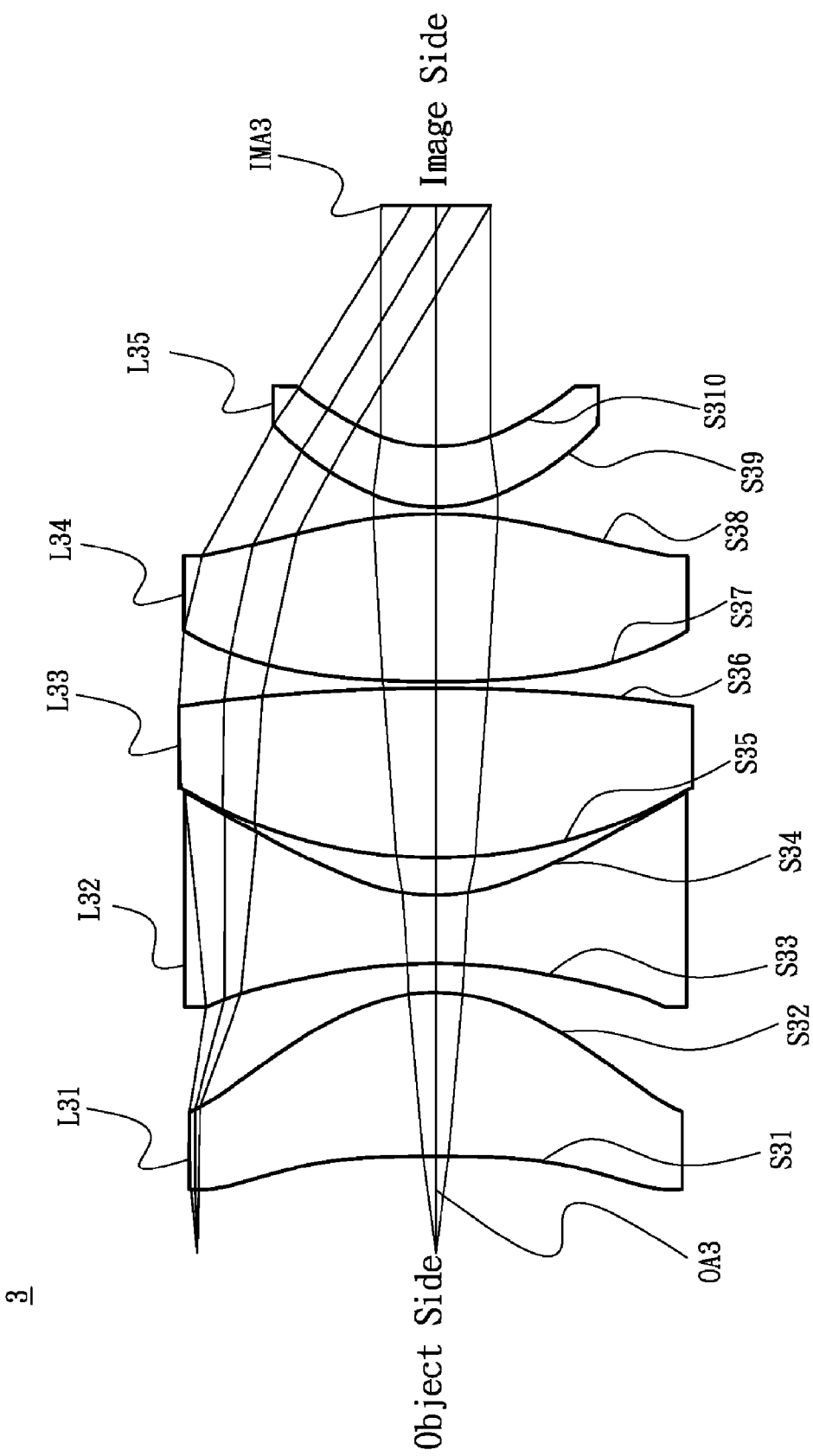
FIG. 3 is a lens layout and optical path diagram of a converter lens assembly in accordance with a second embodiment of the invention.

Referring to FIG. 3, FIG. 3 is a lens layout and optical path diagram of a converter lens assembly in accordance with a second embodiment of the invention. The converter lens assembly 3 includes a first lens L31, a second lens L32, a third lens L33, a fourth lens L34 and a fifth lens L35, all of which are arranged in sequence from an object side to an image side along an optical axis OA3. The first lens L31 is a concave-convex lens with positive refractive power and made of plastic material. The object side surface S31 and the image side surface S32 are aspheric surfaces. The second lens L32 is a biconcave lens with negative refractive power and made of plastic material. The object side surface S33 and the image side surface S34 are aspheric surfaces. The third lens L33 is a biconvex lens with positive refractive power and made of glass material. The object side surface S35 and the image side surface S36 are spherical surfaces. The fourth lens L34 is a biconvex lens with positive refractive power and made of plastic material. The object side surface S37 and the image side surface S38 are aspheric surfaces. The fifth lens L35 is a convex-concave lens with positive refractive power and made of plastic material. The object side surface S39 and the image surface S310 are aspheric surfaces.

By the above design of the lenses, the converter lens assembly 3 is provided with good optical performance when connecting to a zoom lens.

In order to achieve the above purpose and effectively enhance the optical performance, the converter lens assembly 3 of the second embodiment of the invention is provided with the optical specifications shown in Table 3, which include radius of curvature of each lens surface, thickness between adjacent surface, refractive index of each lens and Abbe number of each lens.

TABLE 3

| Surface Number | Radius of Curvature (mm) | Thickness (mm) | Nd | Vd | Remark |
| --- | --- | --- | --- | --- | --- |
| S31 | −43.8 | 2.40 | 1.535 | 56 | The First Lens L31 |
| S32 | −2.5 | 0.41 | | | |
| S33 | −7.5 | 1.00 | 1.636 | 24 | The Second Lens L32 |
| S34 | 2.6 | 0.55 | | | |
| S35 | 7.4 | 2.47 | 1.795 | 45.3 | The Third Lens L33 |
| S36 | −26.9 | 0.10 | | | |
| S37 | 17.1 | 2.45 | 1.535 | 56 | The Fourth Lens L34 |
| S38 | −5.8 | 0.10 | | | |
| S39 | 2.4 | 0.88 | 1.535 | 56 | The Fifth Lens L35 |
| S310 | 2.1 | 3.51 | | | |

In the second embodiment, the conic constant k and the aspheric coefficients A, B, C, D, E, F, G of each surface are shown in Table 4.

TABLE 4

| Surface Number | k | A | B | C | D | E | F | G |
| --- | --- | --- | --- | --- | --- | --- | --- | --- |
| S31 | 1.51E+01 | −8.68E−03 | 5.29E−04 | 3.52E−07 | −1.11E+00 | 9.05E−13 | −4.00E−10 | |
| S32 | −3.41E+00 | −7.91E−03 | 7.34E−04 | −1.94E−05 | −5.76E−07 | 2.97E−08 | 1.51E−09 | |
| S33 | −1.50E+00 | 3.08E−03 | −1.90E−04 | −1.30E−06 | 6.43E−08 | −1.59E+00 | −3.67E−10 | |
| S34 | −3.19E+00 | −4.96E−04 | 1.24E−05 | 1.81E−07 | 2.63E−10 | −1.41E−10 | 4.48E−11 | |
| S37 | 1.59E−03 | −3.45E−06 | 4.43E−07 | −1.93E−08 | 1.56E−10 | −3.87E−12 | 4.45E−12 | 4.45E−12 |
| S38 | 9.46E−04 | −1.13E−03 | 4.41E−08 | 1.26E−08 | | | | |
| S39 | −1.44E−03 | 7.48E−04 | −7.03E−05 | 3.09E−07 | −2.43E−07 | 3.92E−09 | 8.99E−10 | 8.99E−10 |
| S310 | −8.33E−03 | 1.43E−03 | −8.90E−05 | −1.72E−07 | −1.10E−07 | −2.99E−08 | 2.46E−08 | 2.46E−08 |

For the converter lens assembly 3 of the second embodiment, the effective focal length $f_1$ of the first lens L31 is equal to 4.94 mm, the effective focal length $f_2$ of the second lens L32 is equal to −2.95 mm, the effective focal length $f_{345}$ of the combination of the third lens L33, the fourth lens L34 and the fifth lens L35 is equal to 4.01 mm. According to the above data, the following values can be obtained:

$$|f_1/f_2|=1.674576,$$

$$|f_{345}/f_2|=1.359322,$$

which respectively satisfy the above conditions (1) and (2).

Figure 4A:
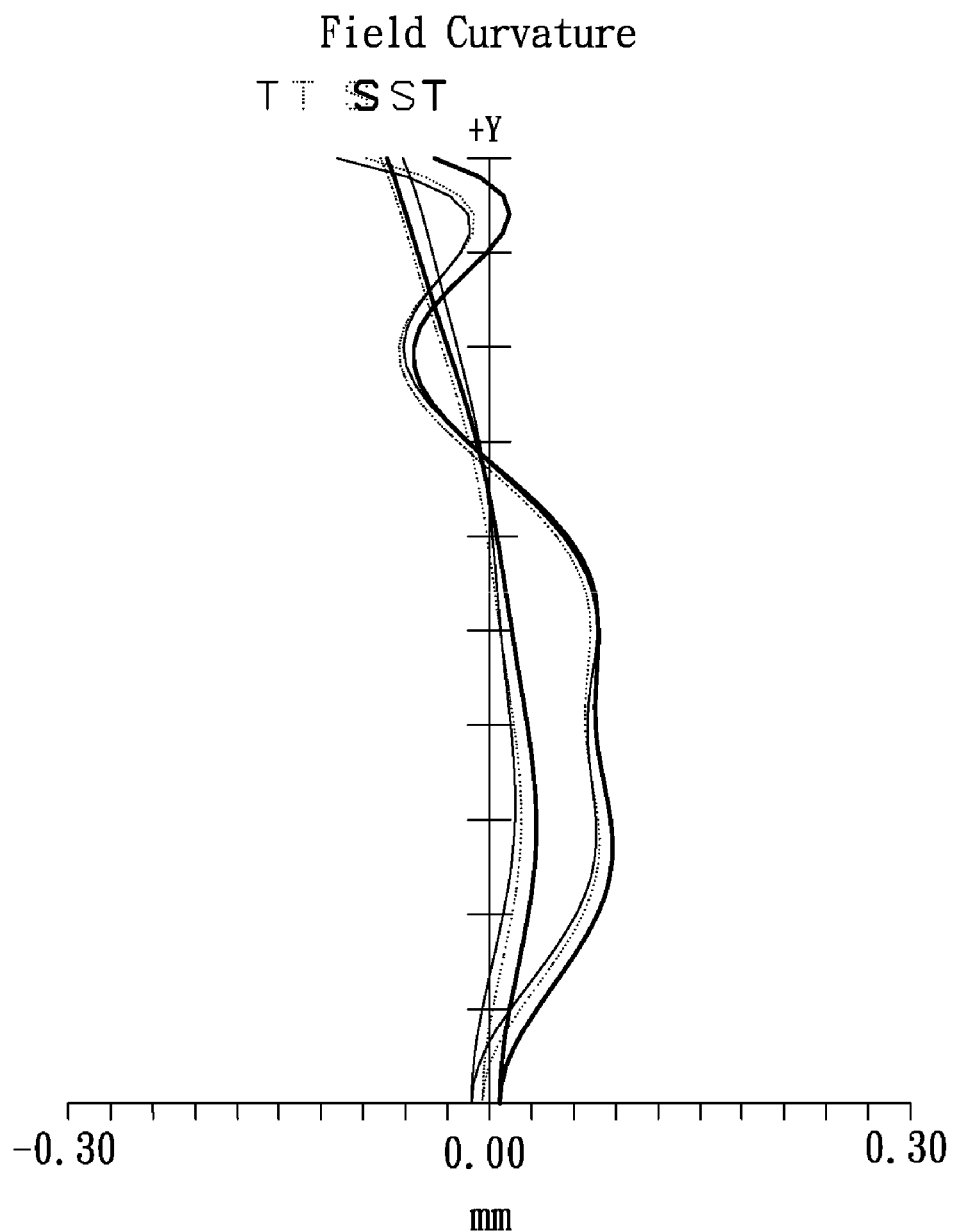
FIG. 4A is a field curvature diagram of a converter lens assembly in accordance with a second embodiment of the invention.
Figure 4B:
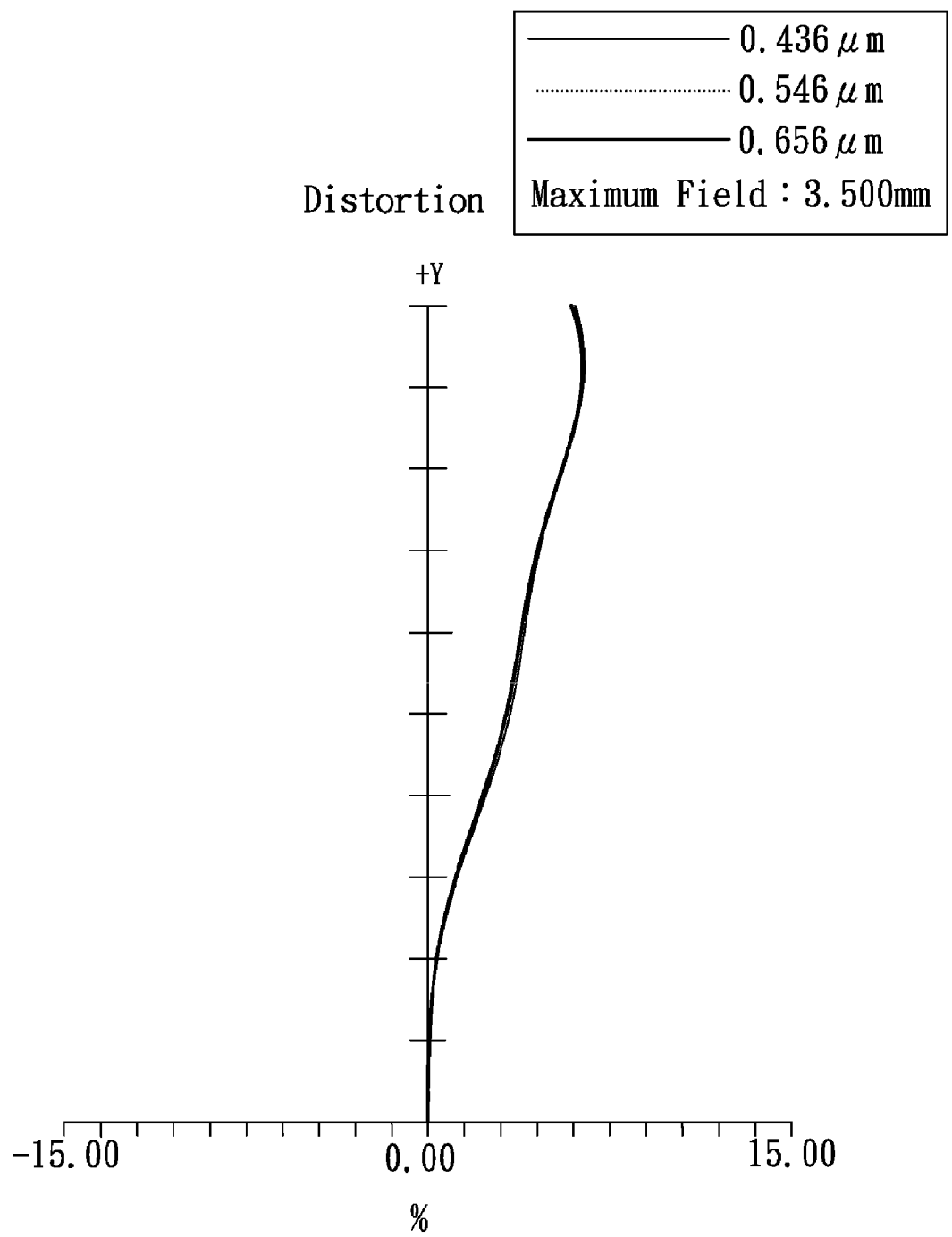
FIG. 4B is a distortion diagram of a converter lens assembly in accordance with a second embodiment of the invention.
Figure 4C:
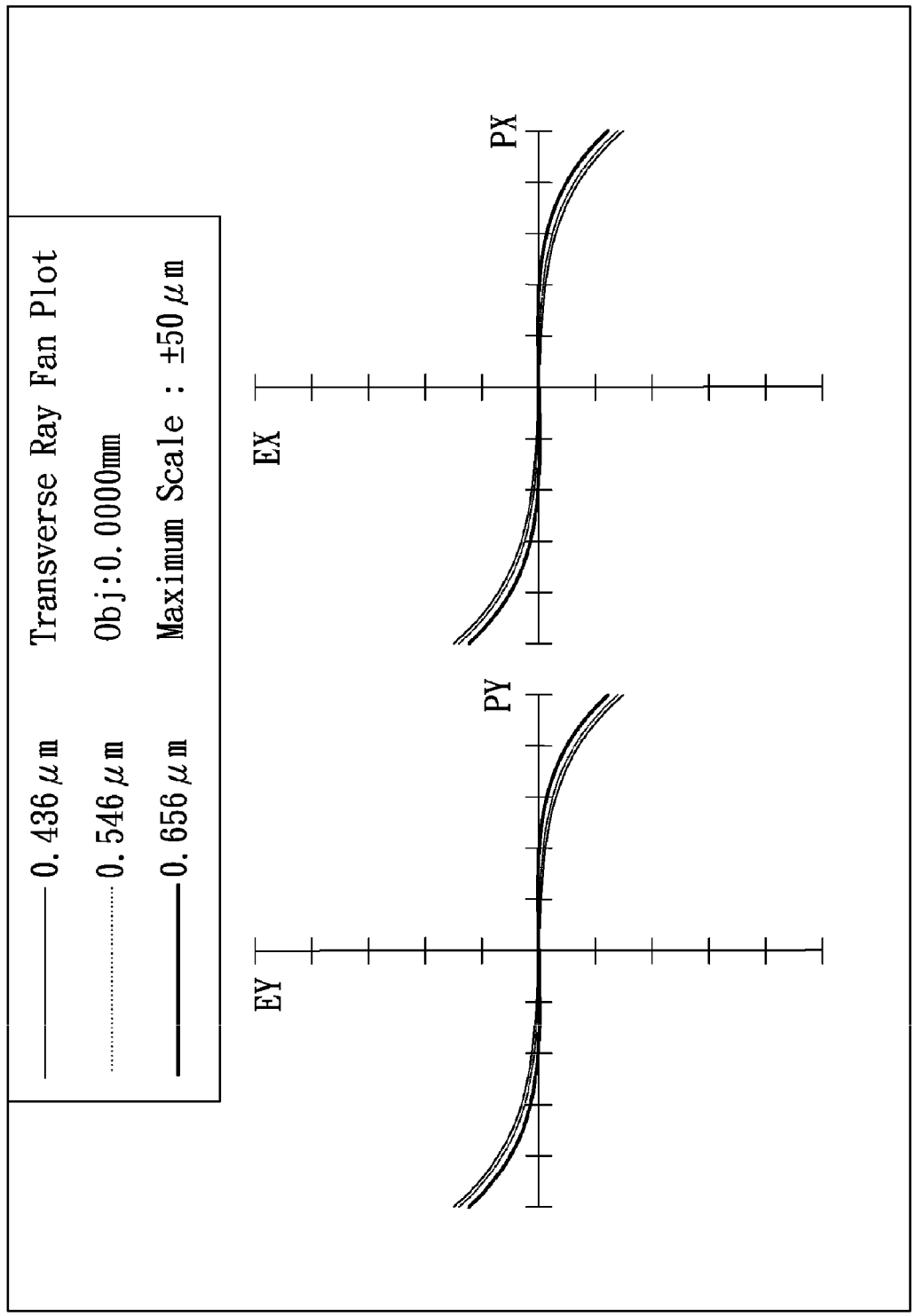
FIGS. 4C-4F are transverse ray fan diagrams of a converter lens assembly in accordance with a second embodiment of the invention.
Figure 4D:
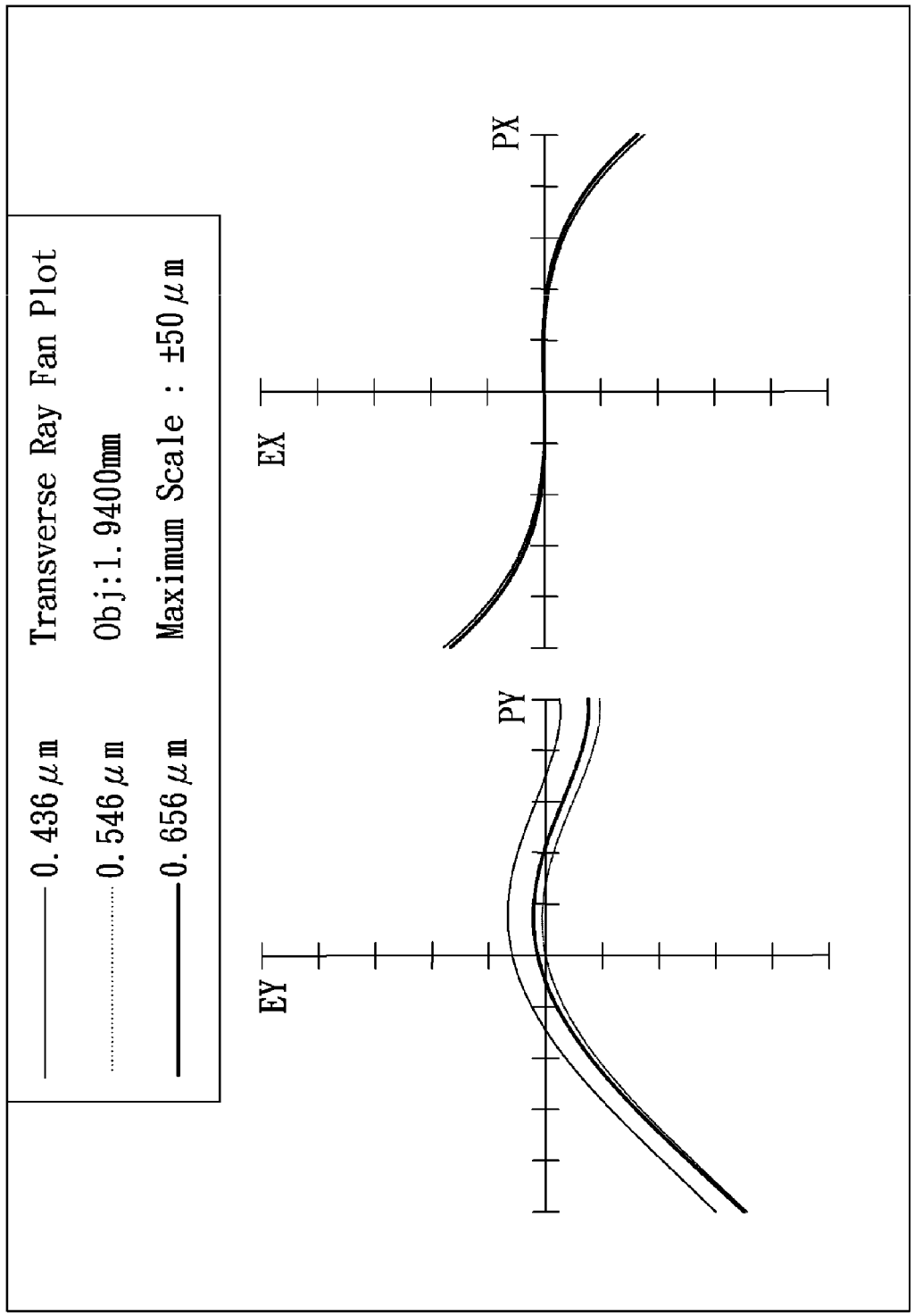
Figure 4E:
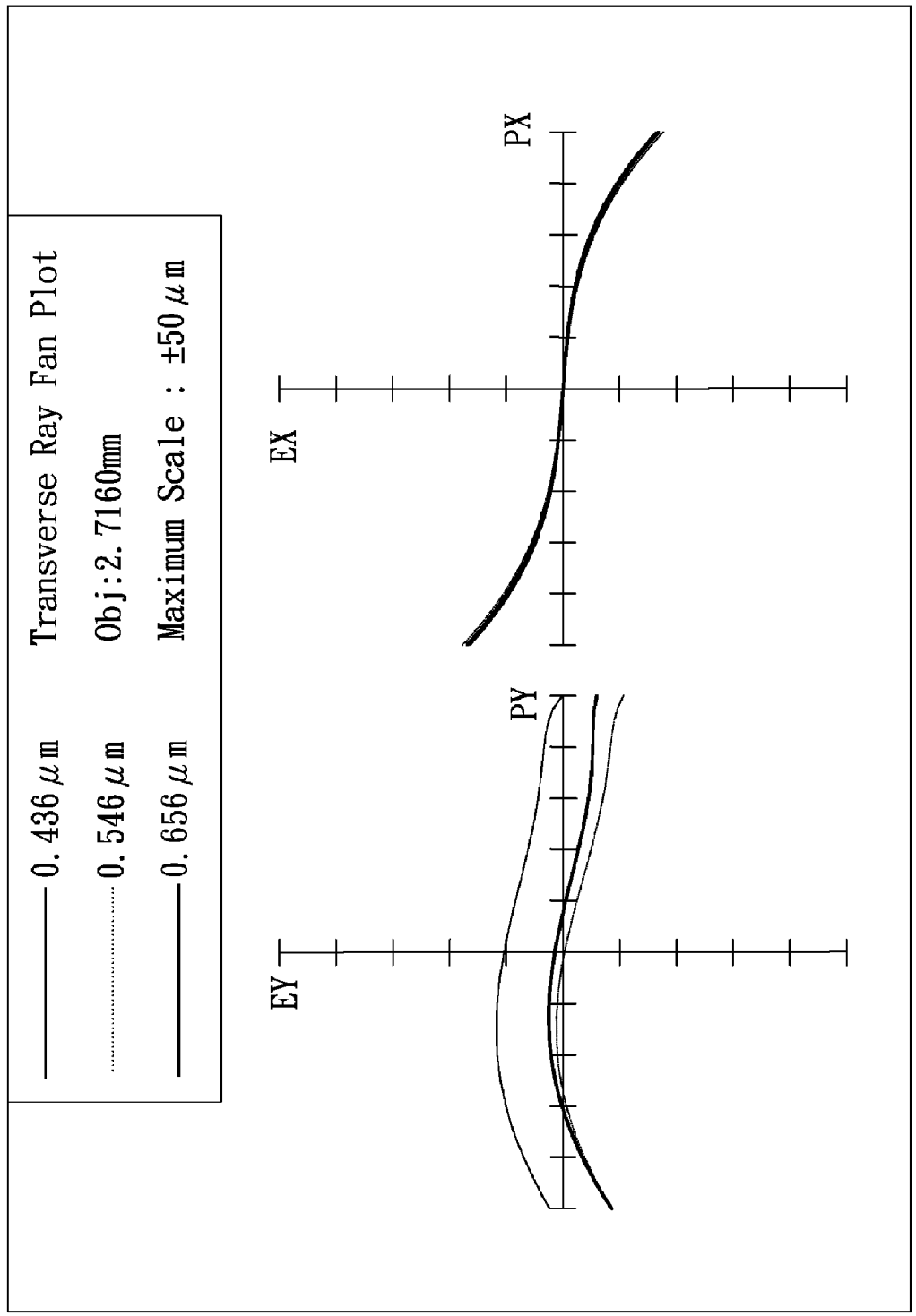
Figure 4F:
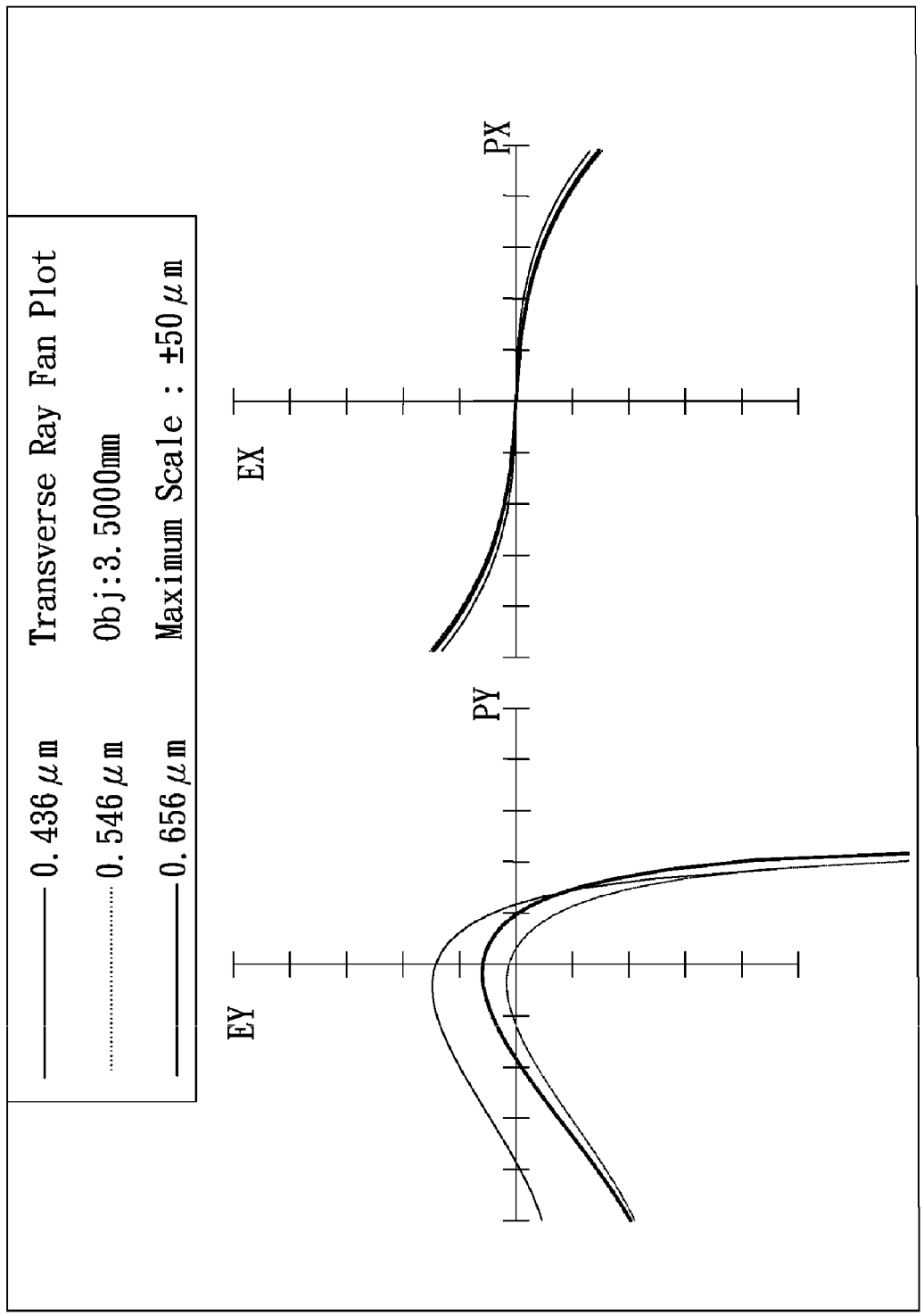

By the above arrangements of the lenses, the converter lens assembly 3 of the second embodiment can meet the requirements of optical performance as seen in FIGS. 4A-4F, wherein FIG. 4A shows the field curvature diagram of the converter lens assembly 3 of the second embodiment, FIG. 4B shows the distortion diagram of the converter lens assembly 3 of the second embodiment, and FIGS. 4C-4F show the transverse ray fan diagram of the converter lens assembly 3 of the second embodiment.

It can be seen from FIG. 4A that the field curvature of tangential direction and sagittal direction in the converter lens assembly 3 of the second embodiment ranges between −0.12 mm and 0.10 mm for the wavelength range between 0.436 μm and 0.656 μm. It can be seen from FIG. 4B (the three lines in the figure almost coincide to appear as if a single line) that the distortion in the converter lens assembly 3 of the second embodiment is smaller than 7.0% for the wavelength range between 0.436 μm and 0.656 μm. It can be seen from FIGS. 4C-4F that the transverse ray fan of different image highs in the converter lens assembly 3 of the second embodiment ranges between −70 μm and 20 μm for the wavelength range between 0.436 μm and 0.656 μm. It is obvious that the field curvature, the distortion and the transverse ray fan of the converter lens assembly 3 of the second embodiment can be corrected effectively, thereby capable of obtaining good optical performance.

Figure 5:
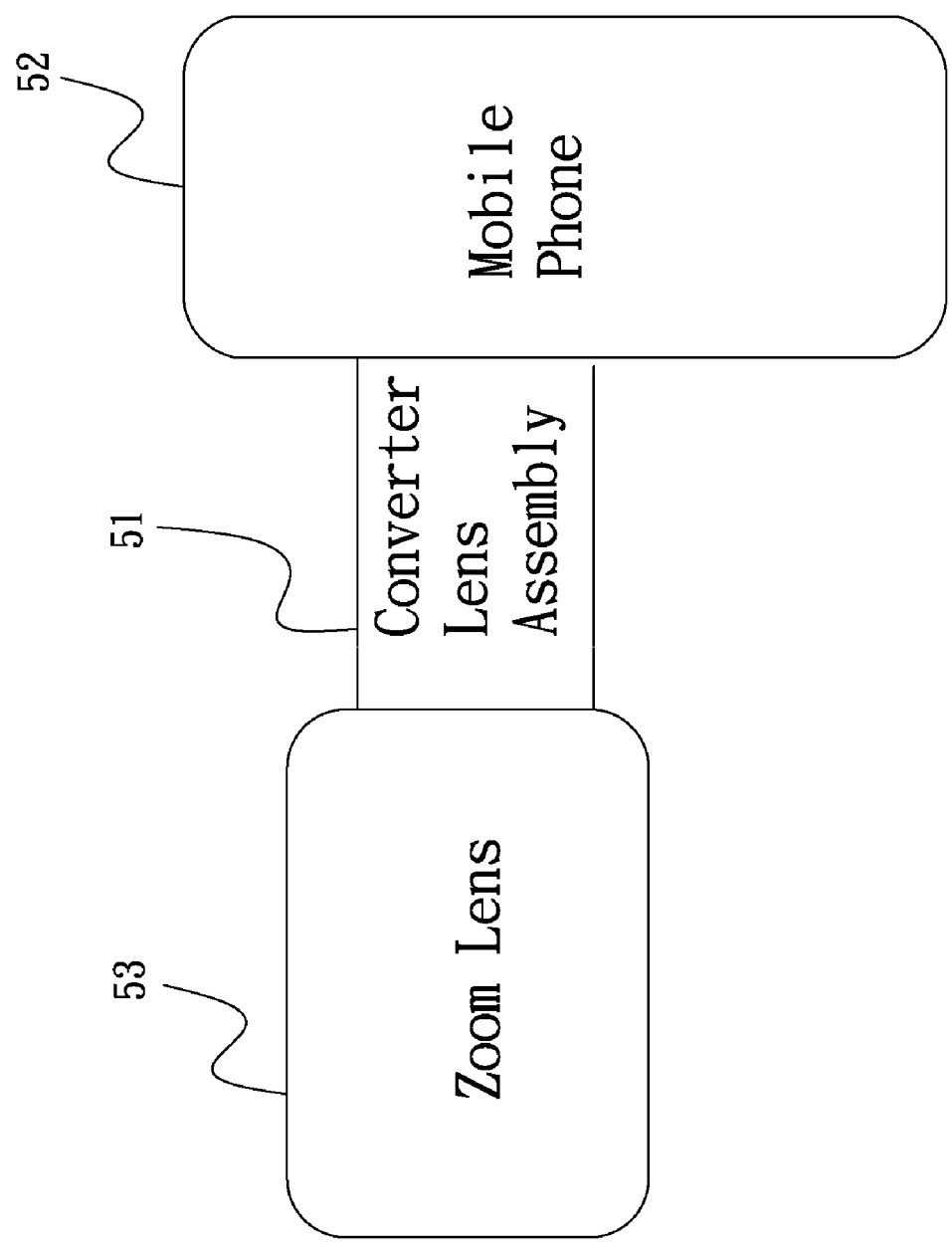
FIG. 5 is a first structure diagram of a converter lens assembly in accordance with an embodiment of the invention applies to a mobile phone.

Referring to FIG. 5, FIG. 5 is a first structure diagram of a converter lens assembly applies to a mobile phone in accordance with an embodiment of the invention. When in use, one end of a converter lens assembly 51 is connected to a lens (not shown) of a mobile phone 52, and then the other end of the converter lens assembly 51 is connected to a zoom lens 53. The mobile phone 52, originally only having a fixed focal length function, turns to have a zoom lens function because of the zoom lens 53.

Figure 6:
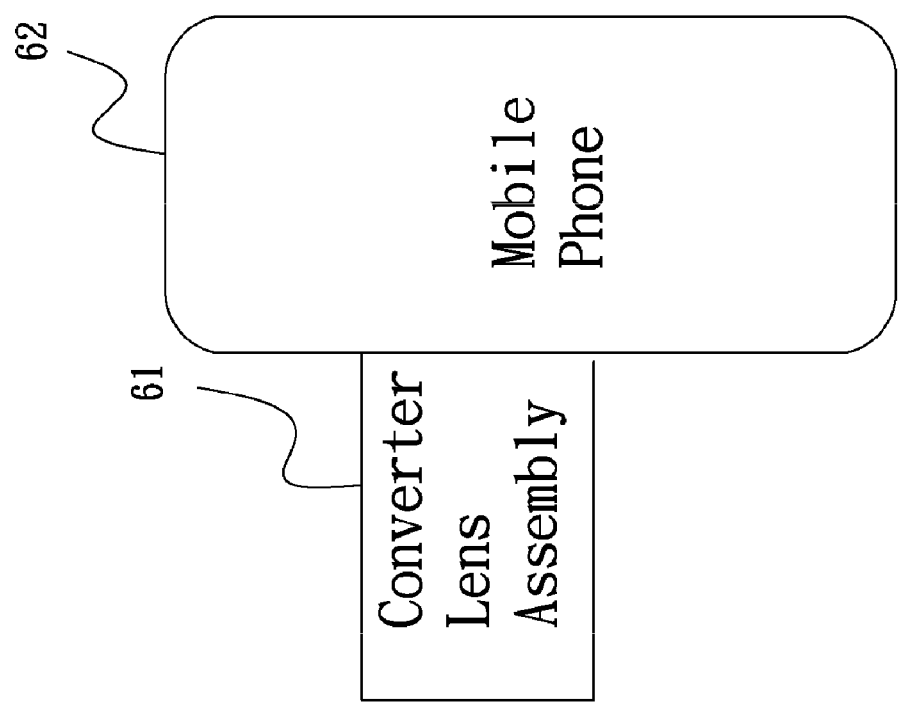
FIG. 6 is a second structure diagram of a converter lens assembly in accordance with an embodiment of the invention applies to a mobile phone.

Referring to FIG. 6, FIG. 6 is a second structure diagram of a converter lens assembly applies to a mobile phone in accordance with an embodiment of the invention. When in use, one end of a converter lens assembly 61 is connected to a lens (not shown) of a mobile phone 62 and the other end of the converter lens assembly 61 is not connected to any lenses. The mobile phone 62, originally only having a fixed focal length function turns to have a marco lens function that can generate high magnification photos in nearer distances.

In the above embodiments, the second lens is with negative refractive power and the third lens is with positive refractive power. However, it has the same effect and falls into the scope of the invention that the second lens is changed into with positive refractive power and the third lens is changed into with negative refractive power.

In the above embodiments, both surfaces of the first lens, the second lens, the fourth lens and the fifth lens are aspheric surfaces, while both surfaces of the third lens are spherical surfaces. However, it has the same effect and falls into the scope of the invention that partial of or all of the first lens, the second lens, the third lens, the fourth lens and the fifth lens are changed into at least one surface of which is an aspheric surface.

While the invention has been described by way of examples and in terms of embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A converter lens assembly comprising a first lens, a second lens, a third lens, a fourth lens and a fifth lens, all of which are arranged in sequence from an object side to an image side along an optical axis, wherein:
   the first lens is with positive refractive power;
   the fourth lens is with positive refractive power; and
   the converter lens assembly satisfies: $1<f_1/f_2|<2$ and $1<f_{345}/f_2|<2$ wherein $f_1$ is an effective focal length of the first lens, $f_2$ is an effective focal length of the second lens, and $f_{345}$ is an effective focal length of the combination of the third lens, the fourth lens and the fifth lens.

2. The converter lens assembly as claimed in claim 1, wherein the second lens is with negative refractive power and the third lens is with positive refractive power.

3. The converter lens assembly as claimed in claim 1, wherein the second lens is with positive refractive power and the third lens is with negative refractive power.

4. The converter lens assembly as claimed in claim 1, wherein the fifth lens is with positive refractive power.

5. The converter lens assembly as claimed in claim 1, wherein the fifth lens is with negative refractive power.

6. The converter lens assembly as claimed in claim 1, wherein the first lens is a biconvex lens, the second lens is a biconcave lens with negative refractive power, the third lens is a biconvex lens with positive refractive power, the fourth lens is a biconvex lens and the fifth lens is a convex-concave lens with negative refractive power.

7. The converter lens assembly as claimed in claim 1, wherein the first lens is a concave-convex lens, the second lens is a biconcave lens with negative refractive power, the third lens is a biconvex lens with positive refractive power, the fourth lens is a biconvex lens and the fifth lens is a convex-concave lens with positive refractive power.

8. The converter lens assembly as claimed in claim 1, wherein the first lens comprises two surfaces, at least one of which is an aspheric surface or both of which are aspheric surfaces.

9. The converter lens assembly as claimed in claim 1, wherein the second lens comprises two surfaces, at least one of which is an aspheric surface or both of which are aspheric surfaces.

10. The converter lens assembly as claimed in claim 1, wherein the third lens comprises two surfaces, at least one of which is an aspheric surface or both of which are aspheric surfaces.

11. The converter lens assembly as claimed in claim 1, wherein the third lens comprises two surfaces, both of which are spherical surfaces.

12. The converter lens assembly as claimed in claim 1, wherein the fourth lens comprises two surfaces, at least one of which is an aspheric surface or both of which are aspheric surfaces.

13. The converter lens assembly as claimed in claim 1, wherein the fifth lens comprises two surfaces, at least one of which is an aspheric surface or both of which are aspheric surfaces.

14. An image capture device comprising a mobile phone and the converter lens assembly as claimed in claim 1, wherein:
   the converter lens assembly comprises an end, and the end is connected to the mobile phone.

15. The image capture device as claimed in claim 14, further comprising a zoom lens, wherein the zoom lens comprises an end, and the end is connected to the converter lens assembly.

* * * * *